US012602150B2

(12) United States Patent
Speichermann

(10) Patent No.: US 12,602,150 B2
(45) Date of Patent: Apr. 14, 2026

(54) ENERGY STORAGE MANAGEMENT SYSTEM FOR AN AT LEAST PARTIALLY ELECTRICALLY DRIVEN VEHICLE, AND METHOD

(71) Applicant: Dr. Ing. h.c. F. Porsche Aktiengesellschaft, Stuttgart (DE)

(72) Inventor: Justus Speichermann, Stuttgart (DE)

(73) Assignee: Dr. Ing. h.c. F. Porsche Aktiengeseiischaft (DE)

( * ) Notice: Subject to any disclaimer, the term of this patent is extended or adjusted under 35 U.S.C. 154(b) by 284 days.

(21) Appl. No.: 18/369,503

(22) Filed: Sep. 18, 2023

(65) Prior Publication Data

US 2024/0184437 A1 Jun. 6, 2024

(30) Foreign Application Priority Data

Dec. 6, 2022 (DE) ..................... 10 2022 132 332.3

(51) Int. Cl.
*G06F 3/04847* (2022.01)
*B60L 53/62* (2019.01)
(Continued)

(52) U.S. Cl.
CPC .......... *G06F 3/04847* (2013.01); *B60L 53/62* (2019.02); *B60L 53/665* (2019.02);
(Continued)

(58) Field of Classification Search
CPC .... G06F 3/04847; G06F 3/0486; B60L 53/62; B60L 53/665; B60L 55/00; B60L 58/12; B60L 2250/00; B60L 53/60; B60L 53/68
See application file for complete search history.

(56) References Cited

U.S. PATENT DOCUMENTS

2012/0053771 A1 3/2012 Yoshida
2013/0274972 A1 10/2013 Kusumi et al.
(Continued)

FOREIGN PATENT DOCUMENTS

DE 102015201895 8/2016
DE 102015106316 A1 * 10/2016 .............. B60L 58/12
(Continued)

OTHER PUBLICATIONS

"MatLab and Simulink in Engineering Practice: Modeling, Calculation and Simulation" by Wolf Dieter Pietruszka 2012.
(Continued)

*Primary Examiner* — Alan D Hutchinson
(74) *Attorney, Agent, or Firm* — Buchanan Ingersoll & Rooney PC

(57) ABSTRACT

An energy storage management system (1) for an at least partially electrically driven vehicle. A control device (2) is used to operate an energy storage device (3) for the vehicle as a function of stored planning rules (4). An interface device (5) with at least one graphical user interface (15) is used to create the planning rules (4) in a user-defined manner. The planning rules (4) include planning parameters (14) configurable by the user interface (15). The planning rules (4) include planning operators (24). The interface device (5) is suitable and designed for supporting a selection and a compilation of the planning parameters (14) and the planning operators (24) to create one or more planning rules (4) using a drag and drop method by the user interface (15).

20 Claims, 1 Drawing Sheet

(51) Int. Cl.
    B60L 53/66       (2019.01)
    B60L 55/00       (2019.01)
    B60L 58/12       (2019.01)
    G06F 3/0486     (2013.01)

(52) U.S. Cl.
    CPC .............. B60L 55/00 (2019.02); B60L 58/12
          (2019.02); G06F 3/0486 (2013.01); *B60L*
                          *2250/00* (2013.01)

(56)          References Cited

U.S. PATENT DOCUMENTS

| | | |
|---|---|---|
| 2019/0248241 A1 | 8/2019 | Badger, II et al. |
| 2020/0101850 A1 | 4/2020 | Harty et al. |
| 2022/0332332 A1 * | 10/2022 | Nakagawa .............. B60L 58/14 |
| 2023/0347776 A1 * | 11/2023 | McLachlan ............. B60L 58/13 |

FOREIGN PATENT DOCUMENTS

| | | |
|---|---|---|
| EP | 3253611 B1 | 12/2017 |
| KR | 20120094303 | 8/2012 |

OTHER PUBLICATIONS

Office Action for DE 10 2022 132 332.3 date Jun. 4, 2024 with partial machine-generated translation.

* cited by examiner

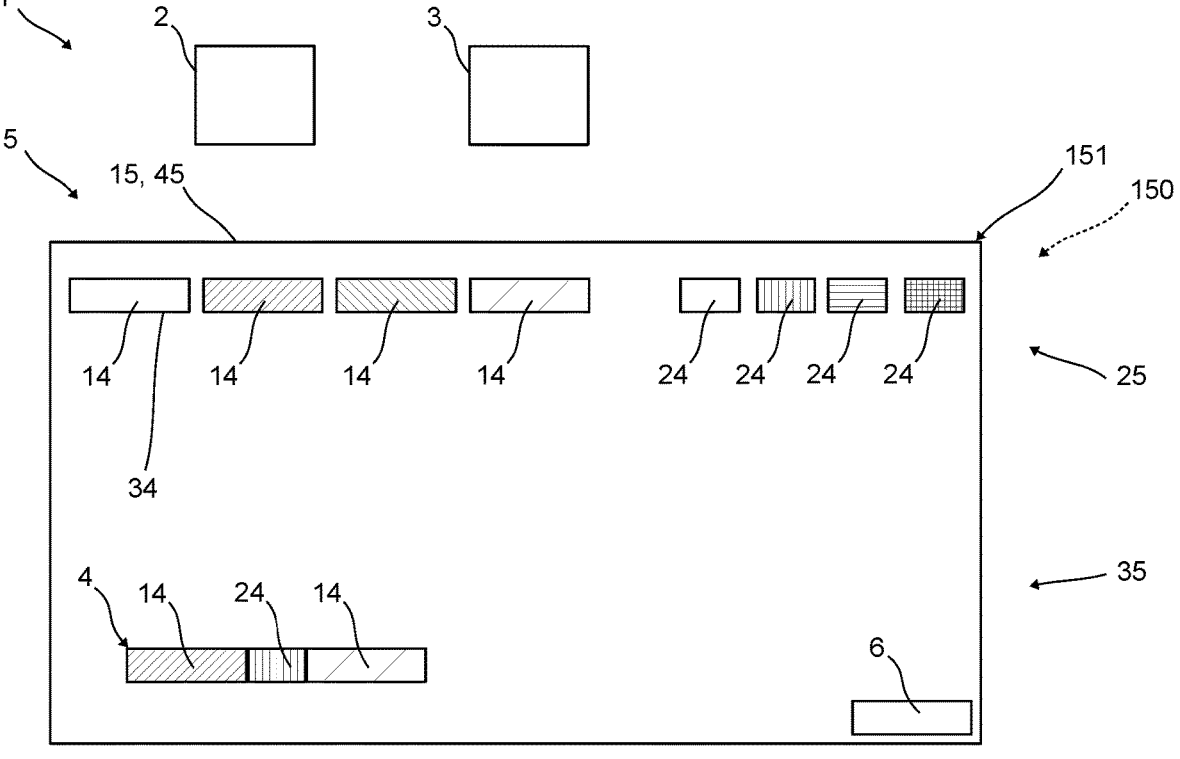

ENERGY STORAGE MANAGEMENT SYSTEM FOR AN AT LEAST PARTIALLY ELECTRICALLY DRIVEN VEHICLE, AND METHOD

CROSS-REFERENCE TO RELATED APPLICATION

This application claims priority on German Patent Application No 10 2022 132 332.3 filed Dec. 6, 2022, the entire disclosure of which is incorporated herein by reference.

BACKGROUND

Field of the Invention

The invention relates to an energy storage management system for an at least partially electrically driven motor vehicle. At least one control device is suitable and designed for operating an energy storage device for the vehicle as a function of stored planning rules. At least one interface device comprising at least one graphical user interface is used to create the planning rules in a user-defined manner. The planning rules include planning parameters configurable by the user interface. The interface stores the created planning rules for the control device. The invention also relates to a method for operating such a system.

Related Art

DE 10 2015 201 895 discloses an energy storage management system where adjustable planning parameters are used to produce a schedule for automatically charging the energy storage device of the vehicle. Time data for the schedule are adjusted on a graphical user interface. However, it is desirable for the charging behavior to be influenced by the user in an even greater variety of ways. Known options for creating more complex planning rules usually prove to be difficult, confusing and/or inconvenient. This is an obstacle to taking full advantage of the benefits of charge planning, particularly for inexperienced users.

In contrast, the object of the invention to provide an improved option for creating planning rules of an energy storage management system so that even inexperienced users can clearly and conveniently create more complex planning rules.

Further advantages and features of the present invention will emerge from the general description and the description of the exemplary embodiments.

SUMMARY OF THE INVENTION

An energy storage management system according to the invention is provided for an at least partially electrically driven vehicle and preferably for an electric vehicle and/or hybrid vehicle. The energy storage management system comprises at least one control device that is suitable and designed for operating an energy storage device for the vehicle as a function of stored planning rules. The energy storage management system comprises at least one interface device comprising at least one graphical user interface for creating the planning rules in a user-defined manner. The planning rules include planning parameters that are configurable by the user interface. The interface device is suitable and designed for storing the created planning rules for the control device. The control device controls a charging process and/or a vehicle preconditioning taking into account the stored planning rules. The planning rules can therefore also be referred to as charging rules and/or conditioning rules. The planning rules include planning operators. The interface device is suitable and designed for supporting a selection and a compilation (combination) of the planning parameters and the planning operators (with one another) to create one or more planning rules using a drag and drop method by means of the user interface. A planning rule may consist of at least one planning parameter and at least one planning operator. The at least one planning parameter and the at least one planning operator are functionally (logically) related.

The energy storage management system disclosed herein offers many advantages. The planning operators provide a significant advantage. This also makes it possible to create more complex and highly individualized planning rules. The compilation of the planning parameters using the drag and drop method provides a significant advantage as well. Overall, this enables even an inexperienced user to easily understandably influence the charging behavior of the vehicle or the vehicle preconditioning according to personal preference.

In some embodiments, the planning operators are selected from a group of planning operators comprising: IF functions; THEN functions; IF-NOT functions; THEN-NOT functions. Such planning operators make it possible to create particularly multilayered or complex planning rules. At the same time, such planning operators are easy to understand in terms of their effects on the planning rules, even for inexperienced users. The planning operators are suitable and designed for compiling the planning parameters within the meaning a programming language syntax.

The interface device of some embodiments is suitable and designed for displaying the planning parameters and the planning operators on the user interface by means of respective graphic icons. The graphic icons may be movable by means of the user interface and arranged in a spatial relationship to one another. The arrangement of the graphic icons may be selected in view of their functional (logical) relationship to one another. The interface device of some embodiments is suitable and designed for creating or recognizing the planning rules on the basis of the spatial arrangement of the graphic icons. The interface device may recognize the functional (logical) relationship between the planning parameters and the planning operators based on the spatial arrangement of the graphic icons (in the target area). The graphic icons may be movable by means of the user interface from at least one selection area to at least one target area thereby providing a particularly intuitive creation of even complex planning parameters.

The graphic icons of some embodiments are at least partially freely combinable with one another in the target area by means of the user interface. The graphic icons also may be freely interchangeable with one another in the target area. For example, the graphic icons may be movable from the target area back to the selection area by means of the user interface. As a result, it is particularly easy to implement changes to existing planning rules or partially completed planning rules. The free combination of graphic icons may be restricted by admissibility requirements and/or plausibility requirements. Non-admissible and/or non-plausible combinations may be graphically highlighted and thereby displayed to the user.

The interface device of some embodiments is suitable and designed for linking the graphic icons that have been moved to the target area to a planning rule automatically in accordance with their arrangement made by the user and/or on the basis of at least one user command. The planning rule then is made available to the control device. A display of the graphic icons can be changed once the graphic icons have been successfully linked to a planning rule. In particular, an unsuccessful linking of the graphic icons will be displayed graphically. As a result, the user can easily see whether the drag and drop method was successful or whether further adjustments are needed.

In some embodiments, values and/or additional properties can be set for at least some of the graphic icons by a user via the user interface. The values can be entered and/or selected. At least some of the graphic icons may comprise selection menus. Menu selection can be made via an activation (e.g., clicking and/or tapping).

The interface device of some embodiments is suitable and designed for assigning created planning rules to at least one user account and to store the planning rules in that location, e.g., in a memory of the control device and/or interface device. The assignment may be performed on the basis of an input previously made by the user and/or a user action (e.g., depending on a key used). The interface device may be suitable and designed for displaying planning rules stored in at least one user account by means of the user interface, so that the planning rules can be changed if needed using the drag and drop method and combined differently.

The interface device of some embodiments is suitable and designed for subjecting the compiled planning parameters and planning operators (in the target area) to an admissibility check and/or plausibility check. In the event of an incorrect compilation, the interface device may output a (graphical) user notification and/or correct the compilation at least partially independently. The interface device may check whether the compilation of the planning parameters and planning operators is non-admissible and/or non-plausible. At least one syntax check or the like can be performed for this purpose.

Non-admissibility may mean that the created planning rules include values or requirements that are outside the intended operating range of the vehicle. Lack of plausibility can, e.g., mean that the planning rules include values or requirements that conflict with the values or requirements of this or another planning rule.

The planning parameters of some embodiments are taken from a group of planning parameters comprising: start state of charge (start SOC), end state of charge (end SOC), charging power, time of day, day of week, frequency, locations (e.g. from the navigation app), seasons, temperatures, user account (driver ID), charging column identification, expected wait time at a charging column, vehicle preconditioning (e.g. interior conditioning), feedback to a power grid (bidirectional charging), price of electricity, operating state of a solar panel, supply of energy to external consumers, surplus charging (by means of regenerative energy), sequential charging (in a motor pool). Other planning parameters suitable for energy storage management are possible as well. The planning parameters include at least one battery parameter and/or at least one charging parameter and/or at least one vehicle parameter and/or at least one time parameter.

Some embodiments provide that at least one planning rule (with planning parameters and planning operators) can be compiled using the drag and drop method and that this planning rule specifies when and/or under what conditions the control device should or can perform a charging process of the energy storage device and/or a vehicle preconditioning.

The charging process of some embodiments includes charging and/or discharging of the energy storage device. In the context of the present invention, the term "discharging" is understood to mean targeted consumption. This can be used for preconditioning, or to supply external consumers with energy. Charging includes surplus charging by means of regenerative energy and sequential charging in a motor pool.

The interface device of some embodiments is suitable and designed to check the created planning rules while taking into account at least one driving parameter that is characteristic of the driving behavior. The interface device may be suitable and designed to adjust the (previously created) planning rules and/or issuing an adjustment proposal on the basis of the check. Driving behavior also includes a charging behavior.

The interface may be device be suitable and designed for independently creating and/or proposing its own planning rules taking into account at least one driving parameter that is characteristic of the driving behavior. The driving behavior may also include a charging behavior. This further simplifies the creation of planning rules. Planning rules that were created by the user in a not economically or environmentally optimal manner can be recognized and optimized.

The interface device may be suitable and designed for assigning at least one fallback plan to the planning rules (created using the drag and drop method). The interface device makes the fallback plan available to the control device at least if the planning rules can currently or in the future not be implemented. This may be the case when the energy storage device cannot be operated according to the planning rules and/or when vehicle preconditioning according to the planning rules is not possible.

For this purpose, the interface device can evaluate events or parameters that it monitors by sensors or events or parameters that are made available to it in some other way. For instance, according to a planning rule, a target state of charge with solar power may be desired at a specific time of day and cannot be achieved due to a lack of solar power. The interface device then resorts to the fallback plan. This can, e.g., include the use of a different power source or calculating a different state of charge.

The user interface may comprise a mobile terminal, in particular a smart device (e.g., smartphone, smartwatch, tablet). The user interface also may be provided by a vehicle multimedia system. The interface device of some embodiments is suitable and designed for connection to such devices, e.g., via hardwire or wireless connectivity. It is also possible that the interface device has its own user interface.

The method of the invention is used to operate an energy storage management system, such as that described above. The method is designed so that the energy storage management system described herein can be operated using the method. The method also may be designed to perform processes performable by the energy storage management system described herein. The interface device and/or the control device is suitable and designed for performing the method, and the embodiments thereof. The interface device and/or the control device is suitable and designed for performing the steps described in the form of a method in the context of this invention. The interface device comprises at least one algorithm for performing the steps described herein. It is possible that this algorithm be stored in part on the mobile terminal (e.g., as an app).

An energy storage device for the vehicle is operated in the method as a function of stored planning rules. A charging process (charging and/or discharging) of the energy storage device and/or vehicle preconditioning may account for the planning rules. The planning rules are created in a user-defined manner (by a user) using a graphical user interface of an interface device. The planning rules include planning parameters configurable by the user interface. The planning rules also include planning operators. The creation of the planning rules includes a user-based configuration of the planning operators. A selection and a compilation (combination) of the planning parameters and the planning operators (with one another) to create one or more planning rules may be performed using a drag and drop method by means of the user interface. Graphic icons that respectively represent the planning parameters and the planning operators are displayed on the user interface, moved on the user interface and arranged in any desired (admissible or plausible) compilation. The interface device can check the compilation for admissibility and/or plausibility. The control device takes into account the planning rules for its energy storage management that are created in this way.

The operation of the energy storage device as a function of the planning rules may include controlling, via the control device, a charging process of the energy storage device and charging and/or discharging of the energy storage device. The operation also may include a vehicle preconditioning and an interior conditioning. The interior conditioning may include air conditioning of the interior and/or heating of heatable vehicle components and, e.g., seats, mirrors, and windows, or the like. Configuring the planning parameters may include an input of values, a selection and/or adjustment of stored planning parameters, and/or a setting of additional properties of at least one planning parameter. In the context of the invention, the created planning rules means the planning rules created using the drag and drop method. The planning rules are stored in a memory device of the control device.

The control device and the interface device and the energy storage device of some embodiments are connected operatively to one another. The graphical user interface may include at least one display unit and/or at least one input unit. The display unit and the input unit may be combined and may comprise a touch-sensitive display (touchscreen). The display unit and the input unit can also be designed separately. For example, a display with a joystick or the like can be provided. The energy storage device may be a traction battery of the vehicle, such as a high-voltage battery.

Further advantages and features of the invention will emerge from the embodiments explained hereinafter with reference to the accompanying drawings.

BRIEF DESCRIPTION OF THE DRAWINGS

FIG. 1 is a purely schematic illustration of an energy storage management system according to the invention.

DETAILED DESCRIPTION

Preferred embodiments of the present disclosure will be described hereinbelow with reference to the accompanying drawings. In the following description, well-known functions or constructions are not described in detail to avoid obscuring the present disclosure in unnecessary detail. Herein, the phrase "coupled" is defined to mean directly connected to or indirectly connected with through one or more intermediate components. Such intermediate components may include both hardware and software based components.

It will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudo-code, and the like represent various processes which may be substantially represented in computer readable media and so executed by a computer or processor, whether or not such computer or processor is explicitly shown.

FIG. 1 shows an energy storage management system 1 according to the invention for an electric vehicle or hybrid vehicle not shown in more detail here. The energy storage management system 1 is operated according to the method according to the invention and comprises a control device 2 for controlling an energy storage device 3, e.g., a traction battery. The control device 2 operates the energy storage device 3 as a function of stored planning rules 4.

It is to be appreciated that the functions of the control device 2 shown in FIG. 1 may be provided through the use of dedicated hardware as well as hardware capable of executing software in association with appropriate software. In one embodiment, some or all of the functions of control device 2 may be performed by at least one processor, such as a computer or an electronic data processor, digital signal processor or embedded micro-controller, field programmable gate array (FPGA), in accordance with code, such as computer program code, software, firmware, register transfer logic and/or integrated circuits that are coded to perform such functions, unless indicated otherwise. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software and/or firmware, random access memory (RAM), and non-volatile storage.

The energy storage management system 1 comprises an interface device 5 with a graphical user interface 15 that is designed, in this case, as a touch-sensitive display or touchscreen 45. The user interface 15 is used to create the planning rules 4 in a user-defined manner. Planning parameters 14 are configured for this purpose by the user interface 15. For example, values are input, or additional properties or the like are selected. The planning rules 4 also include planning operators 24. The planning rules may be stored in a memory of the control device (2) and/or the interface device (5). It is to be appreciated that the interface device (5) may include a processor or controller as described above.

A drag and drop method is provided to enable even inexperienced users to create complex planning rules. For this purpose, the planning parameters 14 and the planning operators 24 are displayed by of individual graphic icons 34 on the user interface 15. The graphic icons 34 can be selected from a selection area 25 by tapping on them and moved to a target area 35 with the finger.

The planning parameters 14 and the planning operators 24 can thus be combined with one another in the target area 35 in a desired functional order. Depending on the selection and the combination, this results in a wide range of different planning rules 4. In text form a planning rule 4 may, for example, read: "If driver A is at location B on Saturdays, then the state of charge must be at least 50% SOC at temperatures >15° C. and at least 70% SOC at temperatures <15° ° C." In this example, the planning parameters (14)

include "driver A", "location B", "Saturday", "state of charge", "temperature", etc. and the planning operator (24) include an IF function and a THEN function.

A currently active user account 6 is displayed on the user interface 15. The created planning rule 4 thus is assigned to this user account 6. Doing so enables different users of the vehicle to create and activate their own planning rules 4.

The user interface 15 in this case is part of a vehicle multimedia system 151. In an alternative embodiment, the user interface 15 shown here is provided by a mobile terminal 150 and, e.g., a smartphone or tablet or the like. It is to be appreciated that the control device (2) and/or the interface device (5) may include a communication device/module (not shown) for communicating to each other. The communication device/module may be a modem, network interface card (NIC), wireless transceiver, etc. The communication device/module will perform its functionality by hardwired and/or wireless connectivity. In the case where the user interface 15 is part of a vehicle multimedia system 151, communications may be by hardwire connectivity. In the case where the interface device (5) is a mobile terminal (150), communications may be by wireless connectivity.

The charging behavior of the vehicle can be influenced by the user in a variety of ways: e.g., on the vehicle, desired SOC at the target location, start SOC with a selected time of day, desired setting for fast travel with optimization of stop a for fastest charging. The charging process can also be optimized in terms of infrastructure, e.g., by surplus charging with solar power or sequentially charging in a motor pool. Bidirectional charging can be provided as well. Current vehicles can trigger certain functions, for instance depending on their position (e.g., home garage) ("geofencing").

The individual planning parameters 14 such as time of day, day of week, frequency, locations (e.g., from the navigation app), seasons, temperatures, driver ID, charging column, start state of charge (start SOC), end state of charge (end SOC), charging power, expected wait time at the charging column, interior conditioning, feedback to the power grid (bidirectional charging), e.g., from a particular price of electricity, etc. are each assigned a unique graphic icon 34 in the user interface 15, e.g., of the vehicle multimedia system 151 or the app of a terminal 150.

There are also graphic icons 34 for the planning operators 24 "IF" and "THEN" or "IF-NOT", similar to a programming language. Using these graphic icons 34, the user can easily compile various very complex individual planning rules 4 (also referred to as charging rules) as needed by dragging and dropping them on the touchscreen 45.

The interface device 5 stores corresponding fallback levels for these planning rules 4. These planning rules 4 can then also be exported or assigned to the driver ID in the backend.

The vehicle can moreover derive its own planning rules 4 from the driving behavior of the drivers and offer them to the driver as a suggestion or propose suggestions with optimizations for the driver's planning rules 4.

The invention claimed is:

1. An energy storage management system (1) for an at least partially electrically driven vehicle, the system comprising:

at least one control device (2) which is suitable and designed for operating an energy storage device (3) for the vehicle as a function of stored planning rules (4);

at least one interface device (5) with at least one graphical user interface (15) for creating the planning rules (4) in a user-defined manner, wherein the planning rules (4)

include planning parameters (14) configurable by means of the user interface (15), and wherein the interface device (5) stores the created planning rules (4) for the control device (2), wherein the planning rules (4) include planning operators (24), wherein the graphical user interface (15) is configured to receive a user input including a drag and drop of one or more graphic icons (34) to at least one target area (35) displayed on the graphical user interface (15);

wherein the interface device (5) is configured to receive a selection and a compilation of the planning parameters (14) and the planning operators (24) from the graphical user interface (15), and link at least two of the one or more graphic icons moved to a common target area of the at least one target area to create one or more planning rules (4);

wherein the interface device is configured to subject the compiled planning parameters and planning operators to an admissibility check and correct an inadmissible compilation of planning parameters and planning operators;

wherein the created planning rules stored by the interface device including an admissible compilation of planning parameters and planning operators; and wherein the at least control device being configured to perform at least one of a charging process and a vehicle preconditioning according to the stored planning rules.

2. The energy storage management system (1) of claim 1, wherein the planning operators (24) are selected from a group of planning operators (24) comprising: IF functions; THEN functions; IF-NOT functions; THEN-NOT functions.

3. The energy storage management system (1) of claim 1, wherein the interface device (5) is suitable and designed for displaying the planning parameters (14) and the planning operators (24) on the user interface (15) by means of the one or more graphic icons (34) and wherein the one or more graphic icons (34) are movable from at least one selection area (25) to the at least one target area (35) by means of the user interface (15).

4. The energy storage management system (1) of claim 3, wherein the at least two graphic icons (34) are at least partially freely combinable in the common target area (35) by means of the graphical user interface (15) and wherein the one or more graphic icons (34) are movable from the at least one target area (35) back to the selection area (25) by means of the graphical user interface (15).

5. The energy storage management system (1) of claim 4, wherein the interface device (5) is suitable and designed for linking the graphic icons (34) that have been moved to the at least one target area (35) to a planning rule (4) automatically in accordance with their arrangement made by the user and/or on the basis of the user input.

6. The energy storage management system (1) of claim 5, wherein at least one of values and additional properties can be set for at least some of the one or more graphic icons (34).

7. The energy storage management system (1) of claim 1, wherein the interface device (5) is suitable and designed for at least one of assigning created planning rules (4) to at least one user account (6) and storing the created planning rules (4) in that location, and displaying planning rules (4) stored in at least one user account (6) by means of the user interface (15) so that the created planning rules (4) can be changed using the drag and drop method.

8. The energy storage management system (1) of claim 1, wherein the interface device is further configured to subject the compiled planning parameters and planning operators to a plausibility check and, in the event of an incorrect compilation, output a user notification.

9. The energy storage management system (1) of claim 1, wherein the planning parameters (14) are selected from a group of planning parameters (14) including: start state of charge (start SOC), end state of charge (end SOC), charging power, time of day, day of week, frequency, locations obtain from a navigation application, seasons, temperatures, user account including a driver identification, charging column identification, expected wait time at a charging column, vehicle preconditioning which includes interior conditioning, feedback to a power grid including bidirectional charging, price of electricity, operating state of a solar panel.

10. The energy storage management system (1) of claim 1, wherein at least one of the planning rules (4) specifies at least one of when and under what conditions the control device (2) should or can perform a charging process of the energy storage device (3) and/or a vehicle preconditioning can be compiled using the drag and drop method.

11. The energy storage management system (1) of claim 1, wherein the interface device (5) is suitable and designed for checking the created planning rules (4) taking into account at least one driving parameter that is characteristic of a driving behavior and, based on the check, at least one of adjusting the planning rules (4) and issuing an adjustment proposal.

12. The energy storage management system (1) of claim 1, wherein the interface device (5) is suitable and designed for at least one of independently creating and proposing its own planning rules (4) taking into account at least one driving parameter that is characteristic of a driving behavior.

13. The energy storage management system (1) of claim 1, wherein the interface device (5) is suitable and designed for respectively assigning at least one fallback plan to the created planning rules (4) and making the fallback plan available to the control device (2), at least if the planning rules (4) can currently or in the future not be implemented.

14. The energy storage management system (1) of claim 1, wherein the user interface (15) is provided by a mobile terminal (150), the mobile terminal (150) being configured to operate as at least one of a smart device, and a vehicle multimedia system (151).

15. A method for operating the energy storage management system (1) of claim 1.

16. An energy storage management system (1) for an at least partially electrically driven vehicle, comprising:

at least one control device (2) configured to operate an energy storage device (3) for the vehicle as a function of stored planning rules (4); and at least one interface device (5) including at least one graphical user interface (15) for creating the planning rules (4) in a user-defined manner, the graphical user interface (15) configured to receive a user input including a drag and drop of one or more graphic icons (34) to at least one target area (35) displayed on the graphical user interface (15), and the interface device (5) is configured to receive a selection and a compilation of planning parameters (14) and planning operators (24) from the graphical user interface (15), and link at least two of the one or more graphic icons moved to a common target area of the at least one target area to create one or more planning rules (4), the planning parameters (14) including at least one of: at least one battery parameter, at least one charging parameter, at least one vehicle parameter and at least one time parameter, each planning parameter (14) configurable by means of the user interface (15), wherein the at least one interface device is configured to subject the compiled planning parameters and planning operators to an admissibility check and correct an inadmissible compilation of planning parameters and planning operators, and wherein the at least one interface device (5) stores the created planning rules (4) for the control device (2), the created planning rules (4) including an admissible compilation of planning parameters and planning operators, and the control device (2) is configured to at least one of charge and discharge the energy storge device (3) based on at least one stored planning rule.

17. The energy storage management system (1) of claim 16, wherein the interface device (5) is configured to evaluate at least one driving parameter that is characteristic of the driving behavior and, based on an evaluation result, and is further configured to at least one of adjusted the planning rules (4) and issue an adjustment proposal.

18. The energy storage management system (1) of claim 17, wherein the interface device (5) is configured to perform at least one of independently creating and proposing its own planning rules (4) taking into account the at least one driving parameter that is characteristic of the driving behavior.

19. The energy storage management system (1) of claim 16, wherein the interface device (5) is configured to assign at least one fallback plan to the created planning rules (4) and making the fallback plan available to the control device (2), at least if the planning rules (4) can currently or in the future not be implemented.

20. A method for operating an energy storage management system (1) including an energy storage device (2) for an at least partially electrically driven vehicle, the method comprising:

providing at least one graphical user interface (15) for creating planning rules (4) in a user-defined manner to operate the energy storage device (2);

displaying, by the graphical user interface (15), at least one planning parameter (14) and at least one planning operator (24) via the at least one graphical user interface (15), the planning parameters (14) including at least one of at least one battery parameter, at least one charging parameter, at least one vehicle parameter and/or at least one time parameter, each planning parameter (14) configurable by means of the user interface (15);

receiving, by the graphical user interface (15), a user input including a drag and drop of one or more graphic icons (34) to at least one target area (35) displayed on the graphical user interface (15);

linking, by an interface device (5), the one or more graphic icons (34) in the at least one target area (35) to create one or more planning rules (4);

performing, by the interface device (5), an admissibility check on the copied planning parameters and planning operators;

correcting, by the interface device (5), an inadmissible compilation of planning parameters and planning operators;

storing, by the interface device (5) the created planning rules (4) for at least one control device (2), the created planning rules including an admissible compilation to planning parameters and planning operators; and charging and/or discharging, by the at least one control device (2), the energy storge device (3) based on at least one stored planning rule (4).

* * * * *